US008939798B2

(12) United States Patent
Oberski

(10) Patent No.: US 8,939,798 B2
(45) Date of Patent: Jan. 27, 2015

(54) LOCAL AREA NETWORKS FOR INTELLIGENT PATCHING SYSTEM CONTROLLERS AND RELATED METHODS, CONTROLLERS AND COMMUNICATIONS INTERFACES

(71) Applicant: CommScope, Inc. of North Carolina, Hickory, NC (US)

(72) Inventor: Jeffrey A. Oberski, Lucas, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 161 days.

(21) Appl. No.: 13/664,618

(22) Filed: Oct. 31, 2012

(65) Prior Publication Data

US 2013/0149912 A1 Jun. 13, 2013

Related U.S. Application Data

(60) Provisional application No. 61/569,385, filed on Dec. 12, 2011.

(51) Int. Cl.
*H01R 24/00* (2011.01)
(52) U.S. Cl.
USPC ........................................ 439/676; 439/540.1
(58) Field of Classification Search
USPC ........ 439/676, 620.11, 620.21, 620.23, 540.1
See application file for complete search history.

(56) References Cited

U.S. PATENT DOCUMENTS

| 2006/0198389 | A1 | 9/2006 | Eriokson et al. | |
| 2013/0045643 | A1* | 2/2013 | Hu et al. | 439/676 |
| 2013/0090011 | A1* | 4/2013 | Bolouri-Saransar et al. | 439/620.15 |

FOREIGN PATENT DOCUMENTS

WO   WO 2006/126160 A2   11/2006

OTHER PUBLICATIONS

United Kingdom Search and Examination Report Corresponding to Application No. GB1219829.7; Dated: Mar. 18, 2013; 7 Pages.
Systimax® Solution imVision™ System Brochure, www.commscope.com (Admitted prior art), Jul. 2012.

* cited by examiner

*Primary Examiner* — Khiem Nguyen
(74) *Attorney, Agent, or Firm* — Myers Bigel Sibley & Sajovec, P.A.

(57) ABSTRACT

Communications interfaces are provided that include a connector port that has housing that defines a plug aperture and at least first through eighth contacts that extend into the plug aperture. These communications interfaces further include an Ethernet interface (e.g., an Ethernet switch) and a multi-drop communication interface (e.g., an RS-485 transceiver). First through fourth conductive paths are provided that electrically connect the respective first through fourth contacts of the connector port to the Ethernet interface. Fifth and sixth conductive paths are provided that electrically connect the respective fifth and sixth contacts of the connector port to the multi-drop communication interface.

20 Claims, 9 Drawing Sheets

LOCAL AREA NETWORKS FOR INTELLIGENT PATCHING SYSTEM CONTROLLERS AND RELATED METHODS, CONTROLLERS AND COMMUNICATIONS INTERFACES

CROSS-REFERENCE TO RELATED APPLICATION

This application claims priority under 35 U.S.C. §119 to U.S. Provisional Patent Application Ser. No. 61/569,385, filed Dec. 12, 2011, the entire content of which is incorporated by reference as if set forth fully herein.

FIELD OF THE INVENTION

The present invention relates generally to communications systems and, more particularly, to local area networks that may be used in applications such as the control of intelligent patching systems and to controllers and communications interfaces that are suitable for use in such local area networks.

BACKGROUND

Many businesses, government agencies and other organizations employ dedicated communications systems (also referred to herein as "networks") that enable computers, servers, printers, facsimile machines and the like to communicate with each other through a private network, and with remote locations via a telecommunications service provider. Such communications systems may be hard-wired through, for example, the walls and/or ceilings of a building using communications cables and connectors. Individual communications connectors (which are also referred to herein as "connector ports") such as RJ-45 style modular wall jacks are mounted in offices and other work areas throughout the building (referred to herein as "work area outlets"). Communications cables provide communications paths from the work area outlets to network equipment (e.g., network switches, servers, memory storage devices, etc.) that may be located in a computer room.

A commercial data center is a facility that may be used to run the computer-based applications that handle the core electronic business and operational data of one or more organizations and/or to provide large numbers of users simultaneous, secure, high-speed, fail-safe access to their web sites run by such organizations. These data centers may host hundreds, thousands or even tens of thousands of servers, routers, memory storage systems and other associated equipment. In these data centers, fiber optic communications cables and/or communications cables that include insulated conductive wires are typically used to provide a hard-wired communications system that interconnects the data center equipment.

The cables and connectors in conductive wire-based communication systems that are installed in both office buildings and data centers typically include eight insulated conductors (e.g., copper wires) that are arranged as four differential pairs of conductors. Each differential pair may be used to transmit a separate differential information signal. These conductive wire-based communications systems typically use RJ-45 plugs and jacks to ensure industry-wide compatibility. Pursuant to certain industry standards (e.g., the TIA/EIA-568-B.2-1 standard approved Jun. 20, 2002 by the Telecommunications Industry Association), the eight conductors in RJ-45 plug and jack connectors are aligned in a row in the connection region where the contacts of the plug mate with the contacts of the jack. FIG. 1 is a schematic view of the front portion of an RJ-45 jack that illustrates the pair arrangement and positions of the eight conductors in this connection region that are specified in the type B configuration of the TIA/EIA-568-B.2-1 standard, which is the most widely used configuration. As shown in FIG. 1, under the TIA/EIA 568 type B configuration, conductors 4 and 5 comprise differential pair 1, conductors 1 and 2 comprise differential pair 2, conductors 3 and 6 comprise differential pair 3, and conductors 7 and 8 comprise differential pair 4. Herein, a differential pair of conductors may be referred to simply as a "pair."

In both office network and data center communications systems, the communications cables that are connected to network equipment (e.g., network servers, memory storage devices, network switches, etc.) and to work area outlets may terminate into one or more communications patching systems that may simplify later connectivity changes. Typically, a communications patching system includes one or more "patch panels" that are mounted on equipment rack(s) or in cabinet(s), and a plurality of "patch cords" that are used to make interconnections between patch panel and/or network switch connector ports. As is known to those of skill in the art, a "patch cord" refers to a communications cable that has a connector such as, for example, an RJ-45 plug, on at least one end thereof. A "patch panel" refers to an inter-connection device that includes a plurality (e.g., 24 or 48) of connector ports. Each connector port (e.g., an RJ-45 jack) on a patch panel may have a plug aperture on a front side thereof that is configured to receive the connector of a patch cord (e.g., an RJ-45 plug), and the back end of each connector port may be configured to receive a communications cable. Consequently, each RJ-45 connector port on a patch panel acts to connect the eight conductors of the patch cord that is plugged into the front side of the connector port with the corresponding eight conductors of the communications cable that is terminated into the back end of the connector port.

In a typical office network, "horizontal" cables are used to connect each work area outlet to the back end of a respective connector port on one of a first set of patch panels. In an "interconnect" patching system, a single set of patch cords is used to directly connect the connector ports on the first set of patch panels to respective connector ports on a set of network switches. In a "cross-connect" patching system, two sets of patch panels are provided, and standard patch cords are used to connect the connector ports on the first set of patch panels to respective connector ports on the second set of patch panels, while single-ended patch cords (which are also sometimes referred to as equipment cords) are used to connect the connector ports on the second set of patch panels to respective connector ports on the network switches.

The connections between the work area outlets and the network switches may need to be changed for a variety of reasons, including equipment changes, adding or deleting users, office moves, etc. In an interconnect patching system, these connections are typically changed by rearranging the patch cords that are connected between the first set of patch panels and the network switches. In a cross-connect patching system, the connections between the work area outlets and the network switches are typically changed by rearranging the patch cords that are connected between the first set of patch panels and the second set of patch panels. Both types of patching systems allow a network administrator to easily implement connectivity changes by simply unplugging one end of a patch cord and then plugging it into a different connector port.

So-called "intelligent" patching systems are now available that automatically track and log the connectivity between the connector ports on the network switches and the work area outlets each time the patch cord connections are rearranged. These intelligent patching systems typically use special patch panels and/or patch cords that employ sensors, radio frequency identification tags, serial ID chips and the like to detect patch cord insertions and removals and/or to automatically track patching connections. These systems may further include a plurality of controllers such as rack managers that control operation of the intelligent patching functionality. These controllers may be interconnected via a local area network, and one (or more) of the controllers may act as a master controller (referred to herein as a "network manager"). The network manager may also have a connection to an external controller and/or database such as a system manager computer.

SUMMARY

Pursuant to embodiments of the present invention, communication interfaces are provided that include a connector port that has a housing that defines a plug aperture and at least first through eighth contacts that extend into the plug aperture. These communication interfaces further include an Ethernet interface (e.g., an Ethernet switch) and a differential multi-drop communication interface (e.g., an RS-485 transceiver). First through fourth conductive paths are provided that electrically connect the respective first through fourth contacts of the connector port to the Ethernet interface. Fifth and sixth conductive paths are provided that electrically connect the respective fifth and sixth contacts of the connector port to the multi-drop communication interface.

In some embodiments, the communications interface may also include a multi-drop communication termination that is electrically connected between the fifth and sixth conductive paths. A multi-drop communication termination control circuit may also be provided, and seventh and eighth conductive paths may be provided that electrically connect the respective seventh and eighth contacts to this multi-drop communication termination control circuit. The multi-drop communication termination may be a switch and a resistor that are disposed in series between the fifth and sixth conductive paths.

In some embodiments, the multi-drop communication termination control circuit may be a logic circuit that is configured to automatically sense if the multi-drop communication interface is electrically connected to a downstream device via a second communications connector. The multi-drop communication termination control circuit may be configured to close the switch in response to determining that the multi-drop communication interface is not electrically connected to the downstream device via the second communications connector or to open the switch in response to determining that the multi-drop communication interface is electrically connected to the downstream device via the second communications connector.

In some embodiments, the communications connector may be an RJ-45 jack, and the Ethernet interface may be an Ethernet switch that includes at least three input/output ports. The first through fourth conductive paths of the RJ-45 jack may be electrically connected to respective first through fourth contacts of a second RJ-45 jack via the Ethernet switch. The fifth and sixth conductive paths may be electrically connected to respective fifth and sixth contacts of the second RJ-45 jack, and the multi-drop communication interface may be connected to the fifth and sixth conductive paths via respective first and second tap lines.

According to further embodiments of the present invention, local area networks are provided that include a plurality of controllers. Each of these controllers may include a processor, an input RJ-45 connector port that includes first through eighth contacts, an output RJ-45 connector port that includes first through eighth contacts, an Ethernet interface and a multi-drop communication interface. In these controllers, a first conductive path may connect the fifth contact of the input RJ-45 connector port to the fifth contact of the output RJ-45 connector port and a second conductive path may connect the sixth contact of the input RJ-45 connector port to the sixth contact of the output RJ-45 connector port. In these controllers, the processor is electrically connected to the first through fourth contacts of the input RJ-45 connector port and the first through fourth contacts of the output RJ-45 connector port via the Ethernet interface, and is electrically connected to the fifth and sixth contacts of the input RJ-45 connector port and to the fifth and sixth contacts of the output RJ-45 connector port via the multi-drop communication interface. The local area network further includes a plurality of Ethernet cables. Each of these Ethernet cables may connect the input RJ-45 connector port on a respective one of the controllers to the output RJ-45 connector port on an adjacent controller so that the Ethernet cables connect the controllers in a daisy-chain configuration.

In some embodiments, each controller may also include a switch-activated matched termination that terminates a transmission line that includes the first conductive path and the second conductive path to a matched termination. Each controller may also include a multi-drop communication termination control circuit that controls a switch of the switch-activated matched termination. The switch-activated matched termination on each controller may comprise a resistor that is disposed in series with the switch. The Ethernet interface of each controller may be an Ethernet switch, and the multi-drop communication interface of each controller may be a multi-drop communication transceiver.

According to still further embodiments of the present invention, controllers are provided that include an input RJ-45 connector port that includes first through eighth input contacts, an output RJ-45 connector port that includes first through eighth output contacts, and a processor that is selectively electrically connected to the first through fourth input contacts and to the first through fourth output contacts. In these controllers, the fifth and sixth input contacts may be electrically connected to the fifth and sixth output contacts, and the processor may be electrically connected to the fifth and sixth input contacts and to the fifth and sixth output contacts via a multi-drop communication transceiver.

In some embodiments, the controller may also include an Ethernet switch that is configured to selectively route a differential signal that is received on the first and second input contacts to one of the first and second output contacts or to the processor, and which is further configured to selectively route a differential signal that is received on the third and fourth output contacts to one of the third and fourth input contacts or to the processor. The controller may also include a termination circuit that is configured to insert a resistance in series between the fifth input contact and the sixth input contact in response to a termination control signal. The controller can also include a termination control circuit that is coupled to at least one of the seventh and eighth input contacts. This termination control circuit may be configured to selectively activate the termination control signal.

According to further embodiments of the present invention, methods of operating a local area network that includes at least a first controller and a second controller that are interconnected by a first Ethernet cable and a third controller that is connected to the second controller by a second Ethernet cable are provided. Pursuant to these methods, it may be sensed that a first Ethernet transmission path between the first controller and the third controller that extends through the first and second Ethernet cables has been lost. Thereafter, a first signal may be transmitted from the first controller to the third controller over a multi-drop communication transmission path that extends through the first and second Ethernet cables in response to sensing that the first Ethernet transmission path was lost.

In some embodiments, the first Ethernet transmission path may be a first pair of twisted conductors of the first Ethernet cable and a first pair of twisted conductors of the second Ethernet cable. The multi-drop communication transmission path may be a second pair of twisted conductors of the first Ethernet cable and a second pair of twisted conductors of the second Ethernet cable. The methods may further involve transmitting a second signal over the first Ethernet transmission path and receiving a third signal over a second Ethernet transmission path, where the second Ethernet transmission path comprises a third pair of twisted conductors of the first Ethernet cable and a third pair of twisted conductors of the second Ethernet cable. A reference voltage may also be transmitted from the first controller to the third controller over a reference voltage transmission path, where the reference voltage transmission path comprises at least one conductor of a fourth pair of twisted conductors of the first Ethernet cable and at least one conductor of a fourth pair of twisted conductors of the second Ethernet cable.

DETAILED DESCRIPTION

Figure 1:
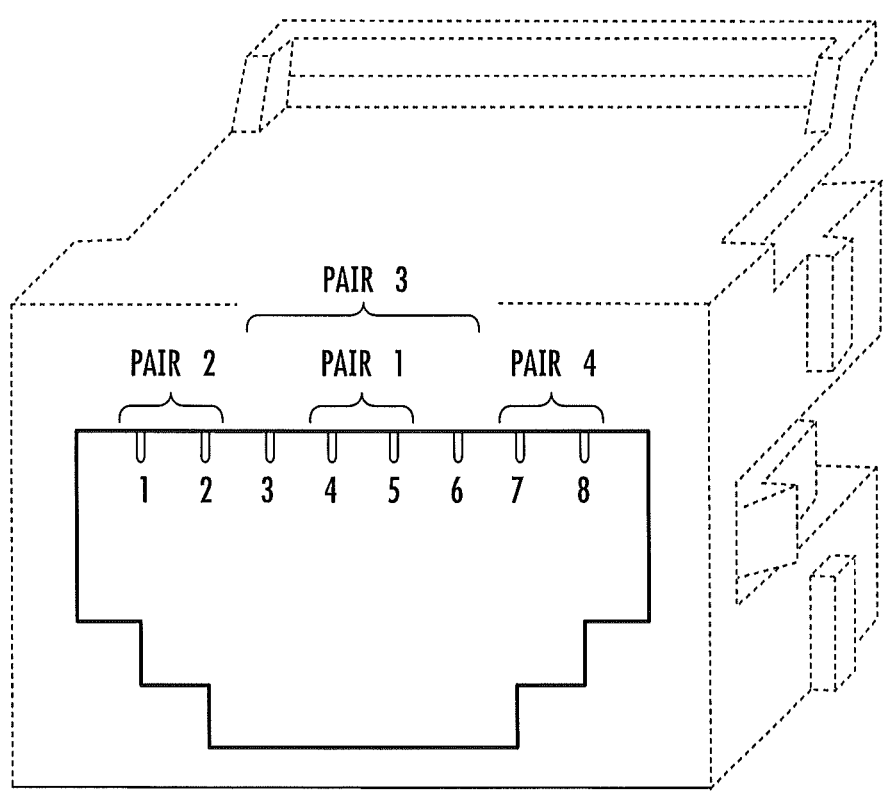
FIG. 1 is a schematic diagram illustrating the contact arrangement for a conventional 8-position communications jack (TIA 568B) as viewed from the front opening (plug aperture) of the jack.

Pursuant to embodiments of the present invention, local area networks, controllers and communications interfaces are provided that may be used, for example, to implement control networks for intelligent patching systems. These intelligent patching control networks may comprise a plurality of controllers that are serially interconnected in a "daisy-chain" configuration using Ethernet patch cords. In some embodiments, the intelligent patching control network may support both (1) Ethernet (e.g., 10BASE-T or Ethernet 100BASE-TX) communications that are transmitted over first and second (transmit and receive) Ethernet transmission paths and (2) multi-drop communications that are transmitted over a separate differential multi-drop transmission path (i.e., a transmission path that supports multi-drop communications). Multi-drop communications refer to communications that are transmitted over a bus in which the components communicating over the bus are all connected to the same set of electrical wires, and some sort of arbitration process may be used to determine which component has the right to transmit information over these electrical wires at any given point in time, while the other devices listen to determine if any of the transmitted data is intended for them. Examples of multi-drop communications include RS-485 communications, Controller Area Network ("CAN") communication interfaces, Thinnet and Thicknet communications, and multi-drop Low Voltage Differential Signaling ("LVDS") communications. The Ethernet transmission paths may support high data rates that may facilitate implementing the full functionality of the intelligent patching system. If one or more of the plurality of controllers in the intelligent patching control network lose power or otherwise become inoperable, then the Ethernet transmission paths through such controller(s) may be lost, creating one or more break(s) in the daisy chain. However, through the provision of the multi-drop communication transmission path, controllers on either side of such a break may still communicate with each other over the slower multi-drop communication transmission path.

In some embodiments, adjacent controllers may be interconnected by a single patch cord that carries both the Ethernet and multi-drop communications. Moreover, the controllers may include a switched matched termination that may be used to match the multi-drop communication transmission line to a matched termination for controllers that are on either end of the daisy-chain. In some embodiments, the controllers may automatically sense whether or not this matched termination should be switched into place.

While the local area networks according to embodiments of the present invention may be suitable to interconnect a plurality of controllers of an intelligent patching system, it will be appreciated that these local area networks and the related controllers and communications interfaces that are disclosed herein may also be used in a variety of other applications.

Embodiments of the present invention will now be described with reference to the accompanying drawings.

Figure 2:
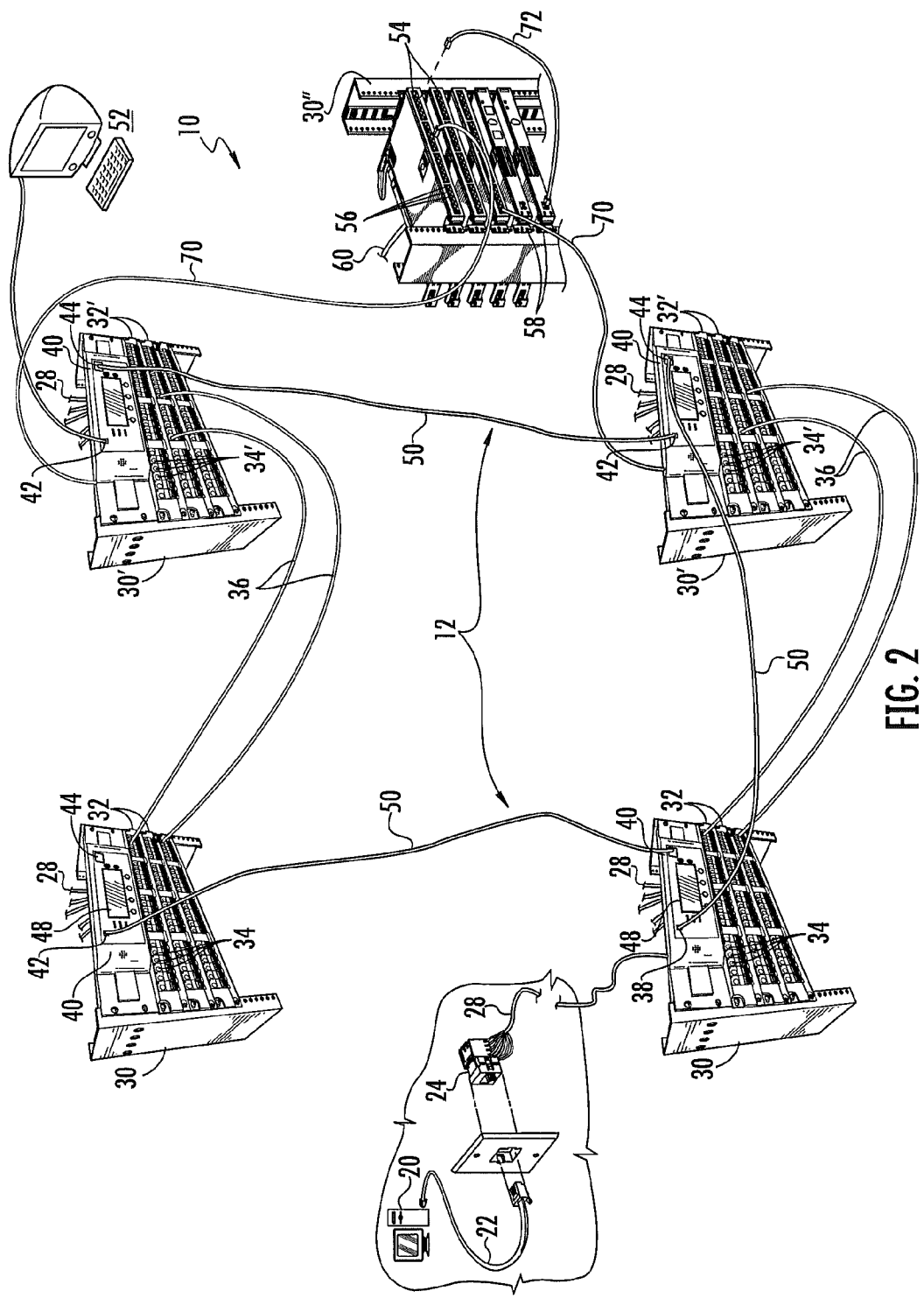
FIG. 2 is a simplified, schematic view of an exemplary intelligent patching system on which the communications interfaces, controllers and/or local area networks according to embodiments of the present invention may be used.

FIG. 2 is a schematic view of a simplified intelligent cross-connect communications system 10 that may be used, for example, to connect computers, printers and other end devices that are located in work areas of a building to network equipment that is located, for example, in a computer room of the building. The local area networks disclosed herein may be used, for example, to interconnect the intelligent patching controllers of the communications system 10 or to interconnect the controllers of similar patching systems that may be used in data center environments.

As shown in FIG. 2, an exemplary computer 20 or other end device is located in a work area of the building. The computer 20 is connected by a patch cord 22 to a modular wall jack 24. A communications cable 28 is routed from the back end of the wall jack 24 to a computer room. While only a single work area end device (computer 20) is shown in FIG. 2, it will be appreciated that there would be hundreds or thousands of work area end devices 20 and wall jacks 24 in a typical office environment, communications system, and hence there may be hundreds or thousands of cables 28 routed into the computer room.

A plurality of first equipment racks 30 are located in the computer room, two of which are shown in FIG. 2. A plurality of patch panels 32 are mounted on each first equipment rack 30. Each patch panel 32 includes a plurality of RJ-45 connector ports 34. The cables 28 from the wall jacks 24 are terminated into the back ends of respective ones of the connector ports 34 of the patch panels 32. A plurality of second equipment racks 30' are also located in the computer room, two of which are shown in FIG. 2. Each second equipment rack 30' has a plurality of second patch panels 32' mounted thereon. Each patch panel 32' includes a plurality of RJ-45 connector ports 34'. A first set of patch cords 36 is used to interconnect the connector ports 34 on the patch panels 32 to respective ones of connector ports 34' on the patch panels 32'.

A rack controller 40 is included in each first equipment rack 30 and each second equipment rack 30'. Each rack controller 40 may include an input port 42, an output port, 44, a processor 46 (not visible in FIG. 2) and a user interface 48. A plurality of patch cords 50 may be used to connect the input port 42 of each rack controller 40 to the output port 44 of an adjacent rack controller 40. The input (or output) port 42 of one of the "end" rack controllers may be connected to a system manager 52 which may control operations of the rack controllers 40. As a result of this interconnectivity, the rack controllers 40 can communicate in a common network as if they were a single controller. Each rack controller 40 may, for example, gather data from intelligent tracking capabilities of the patch panels 32, 32' and/or may control operations of the intelligent patching system at the patch panel level. The interconnected rack controllers 40 and system manager 52 (if provided) may form an intelligent patching controller local area network 12.

As is further shown in FIG. 2, network devices such as, for example, one or more network switches 54 and network routers and/or servers 58 are included, for example, in a third equipment rack 30". Each of the switches 54 may include a plurality of connector ports 56, and each network router and/or server 58 may also include one or more connector ports. One or more external communications lines 60 are connected to at least some of the network devices 58. Single-ended patch cords 70 are used to connect the connector ports 56 on the switches 54 to respective ones of the back ends of the connector ports 34' on the patch panels 32'. Patch cords 72 may be used to interconnect other of the connector ports 56 on the switches 54 with the connector ports provided on the network routers/servers 58. In order to simplify FIG. 2, only a few of the patch cords 36, 70 and 72 are shown.

The communications patching system of FIG. 2 may be used to connect each work area computer 20 or other work area end device to the network switches 54, the network switches 54 to the network routers and servers 58, and the network routers/servers 58 to the external communications lines 60, thereby establishing the physical connectivity required to give devices 20 access to both local and wide area networks. In the cross-connect patching system of FIG. 2, connectivity changes are typically made by rearranging the patch cords 36 that interconnect the connector ports 34 on the patch panels 32 with the connector ports 34' on the patch panels 32'. The rack controllers 40 and the system manager 52 may be used to automatically determine and/or confirm patching connections (i.e., determine and/or confirm the specific connector port pairs that are interconnected by patch cords) between the patch panels 32 mounted on the first equipment racks 30 and the patch panels 32' mounted on the second equipment racks 30', thereby allowing a network administrator to automatically generate and maintain a computer-based log of patching connections.

As will be discussed in detail below, controllers and communications interfaces according to embodiments of the present invention may be used to implement the intelligent patching controller local area network 12 included in the communications system 10 of FIG. 2.

Figure 3:
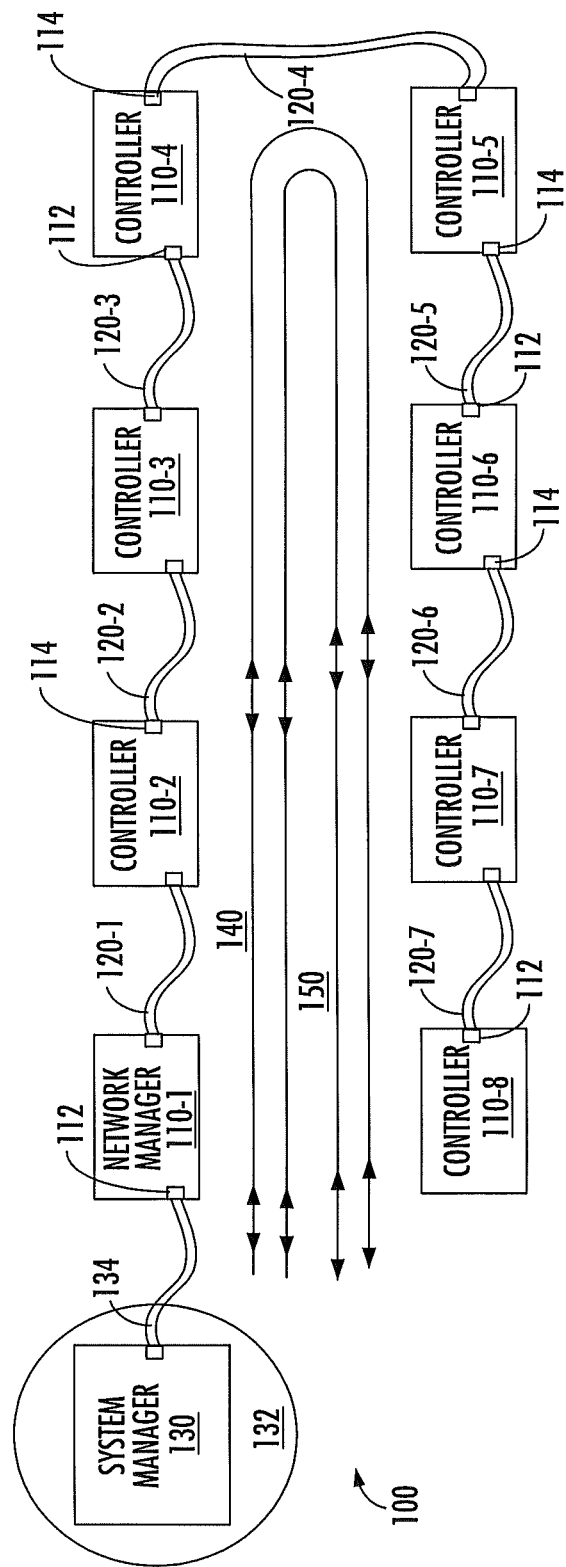
FIG. 3 is a schematic diagram illustrating a local area network according to embodiments of the present invention that may be used to interconnect a plurality of intelligent patching system controllers according to embodiments of the present invention.

FIG. 3 is a schematic diagram illustrating a local area network 100 according to certain embodiments of the present invention that is used to interconnect a plurality of controllers 110-1 through 110-8 (which are generically referred to herein as controllers 110). The controllers 110 may comprise, for example, rack controllers of an intelligent patching system such as the controllers 40 in FIG. 2. The local area network may correspond to the local area network 12 in FIG. 2.

As shown in FIG. 3, each controller 110 includes an input connector port 112, an output connector port 114 and a processor (not shown in FIG. 3). The connector ports 112, 114 are RJ-45 connector ports. The controllers 110-1 through 110-8 are interconnected by a plurality of patch cords 120-1 through 120-7 (which are generically referred to herein as patch cords 120). Each of the patch cords 120 is an Ethernet patch cord that includes eight insulated conductors that are arranged as four twisted pairs of conductors. Each pair of conductors is configured to carry a differential signal. A first of the differential pairs in each patch cord 120 may be used to carry Ethernet signals that are transmitted in a first direction along the local area network 100 (i.e., in the direction from controller 110-1 to controller 110-8), while a second of the differential pairs in each patch cord may be used to carry Ethernet signals that are transmitted in a second, opposite direction along the local area network 100 (i.e., in the direction from controller 110-8 to controller 110-1). Thus, the local area network 100 provides a two-way Ethernet transmission path 140 that any of the controllers 110 may use to communicate with any other of the controllers 110.

As shown in FIG. 3, one of the controllers (here controller 110-1) may act as a network manager. The network manager controller 110-1 may be connected by a bridge connection 134 to another local area network 132 such as a local area network run by the entity that is using the intelligent patching system that includes local area network 100. A system manager 130, which may be a software program running on a computer, may be resident on the customer local area network 132 and may interface with the local area network 100 through the bridge connection 134 between the local area network 132 and the local area network 100. As shown in FIG. 3, the controllers 110-1 through 110-8 are interconnected in series in "daisy-chain" fashion. Thus, for example, a communications from controller 110-2 to 110-6 will pass through patch cords 120-2 through 120-5 and through controllers 110-3 through 110-5 (i.e., through the intervening links on the daisy chain).

The Ethernet communications link 140 provides a high data rate communications link that the controllers 110 may use to communicate with each other and/or with the system manager 130. However, if any of the controllers 110 lose power or otherwise become inoperable, then devices (e.g., controllers 110 and/or the system manager 130) on either side of the inoperable controller 110 cannot communicate with each other over the Ethernet communications link 140. In order to maintain a communications capability, the local area network 100 further includes either an RS-422 or an RS-485 communications link 150 (herein the term "multi-drop communications link" refers to a communications link that operates under any differential multi-drop data transmission standard).

As is known to those of skill in the art, differential multi-drop communication interfaces are physical interfaces that are used by compliant drivers and receivers to transmit and receive communications over multi-drop communications. Examples of multi-drop communication interfaces include RS-485 interfaces, Controller Area Network ("CAN") interfaces, Thinnet and Thicknet interfaces and multi-drop Low Voltage Differential Signaling ("LVDS") interfaces. Before transmitting on a multi-drop communications link 150, a controller (e.g., controller 110-2) will listen to see if any transmissions are currently being carried on the multi-drop communications link 150 in an effort to avoid collisions. If no transmissions are present, the controller may start transmitting, and may monitor the signal received over the communications link 150 to confirm that it is the same signal that is being transmitted (in order to detect collisions). While the multi-drop communications link 150 will typically comprise a lower data rate link as compared to the signals carried on the Ethernet communications link 140, the provision of the multi-drop communications link 150 allows the intelligent patching system to continue operating (although perhaps, in some cases, with reduced functionality or at slower update speeds) even when a power loss, equipment malfunction or other disruption renders one or more of the devices on the daisy-chained local area network 100 inoperable.

The system manager 130 and the controllers 110-1 through 110-8 may use the local area network 100 to exchange control signals and data that are used to perform intelligent patching operations. By way of example, the controllers 110-1 through 110-8 may receive notifications from processors associated with patch panels and/or network switches of the intelligent patching system when patch cords are plugged into, or removed from, the connector ports on patch panels and/or network switches that are under the control of the controller 110. Upon receiving such notifications, a controller 110 can notify other controllers 110 and/or the system manager 130 of these detected patch cord insertions and/or removals. As another example, intelligent patch panels and/or switches that are included in an intelligent patching network may exchange communications that allow these patch panels and/or switches to determine, for each connector port thereon, whether or not the connector port is connected via a patch cord to another connector port and, if so, the identity of the connector port that receives the far end of the patch cord (e.g., the identification of the patch panel or switch and the connector port thereon). This connection information may then be transmitted over the local area network 100 to, for example, the system manager 130 which maintains and updates a database of all of the patching connections in the intelligent patching communications system. The specific control and data signals that are transmitted over the local area network will depend upon the specific implementation of the intelligent patching network. U.S. patent application Ser. No. 13/110, 994, filed May 19, 2011 ("the '994 application"), describes one exemplary intelligent patching system and various of the control and data communications that may be passed between rack controllers and between rack controllers and a system manager computer in that particular intelligent patching system. The entire content of the '994 application is incorporated by reference herein as if set forth in its entirety.

Figure 4:
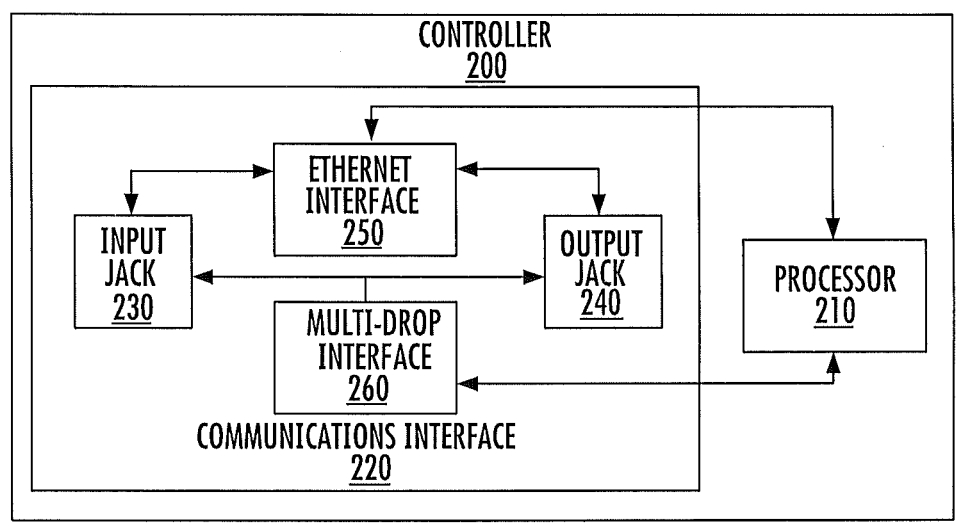
FIG. 4 is a block diagram of a controller according to embodiments of the present invention that may be used in the local area network of FIG. 3.

FIG. 4 is a block diagram of a controller 200 according to embodiments of the present invention that may be used, for example, to implement any of the controllers 110-1 through 110-8 in the local area network 100 of FIG. 3.

As shown in FIG. 4, the controller 200 includes a processor 210 and a communications interface 220. The processor 210 may comprise, for example, a microprocessor, an application specific integrated circuit (ASIC), a microcontroller or the like. The communications interface 220 includes an input connector 230, an output connector 240, an Ethernet interface 250 and a multi-drop communication interface 260. Herein, the term "Ethernet interface" refers to a device that receives or generates an Ethernet signal. Likewise, the term "multi-drop communication interface" is used herein to refer to a device that receives and/or generates a multi-drop signal such as, for example, an RS-485 signal. In the embodiment of FIG. 4, each connector 230, 240 comprises a jack such as, for example, an RJ-45 jack. As shown in FIG. 4, the input connector 230 is electrically connected to the output connector 240, the Ethernet interface 250 and the multi-drop communication interface 260. The processor 210 is connected to both the Ethernet interface 250 and the multi-drop communication interface 260.

Ethernet communications that are received at the input connector 230 are passed either to the processor 210 or the output connector 240 by the Ethernet interface 250. Ethernet communications that are received at the output connector 240 are passed either to the processor 210 or to the input connector 230 via the Ethernet interface 250. Ethernet communications may also be transmitted from the processor 210 to the input connector 230 or to the output connector 240 via the Ethernet interface 250. Multi-drop communications that are received at the input connector 230 are passed to both the output connector 240 and to the processor 210 via the multi-drop communication interface 260. Multi-drop communications that are received at the output connector 240 are passed to both the input connector 230 and the processor 210 via the multi-drop communication interface 260. Multi-drop communications may also be transmitted from the processor 210 to the input connector 230 and the output connector 240 via the multi-drop communication interface 260.

Figure 5:
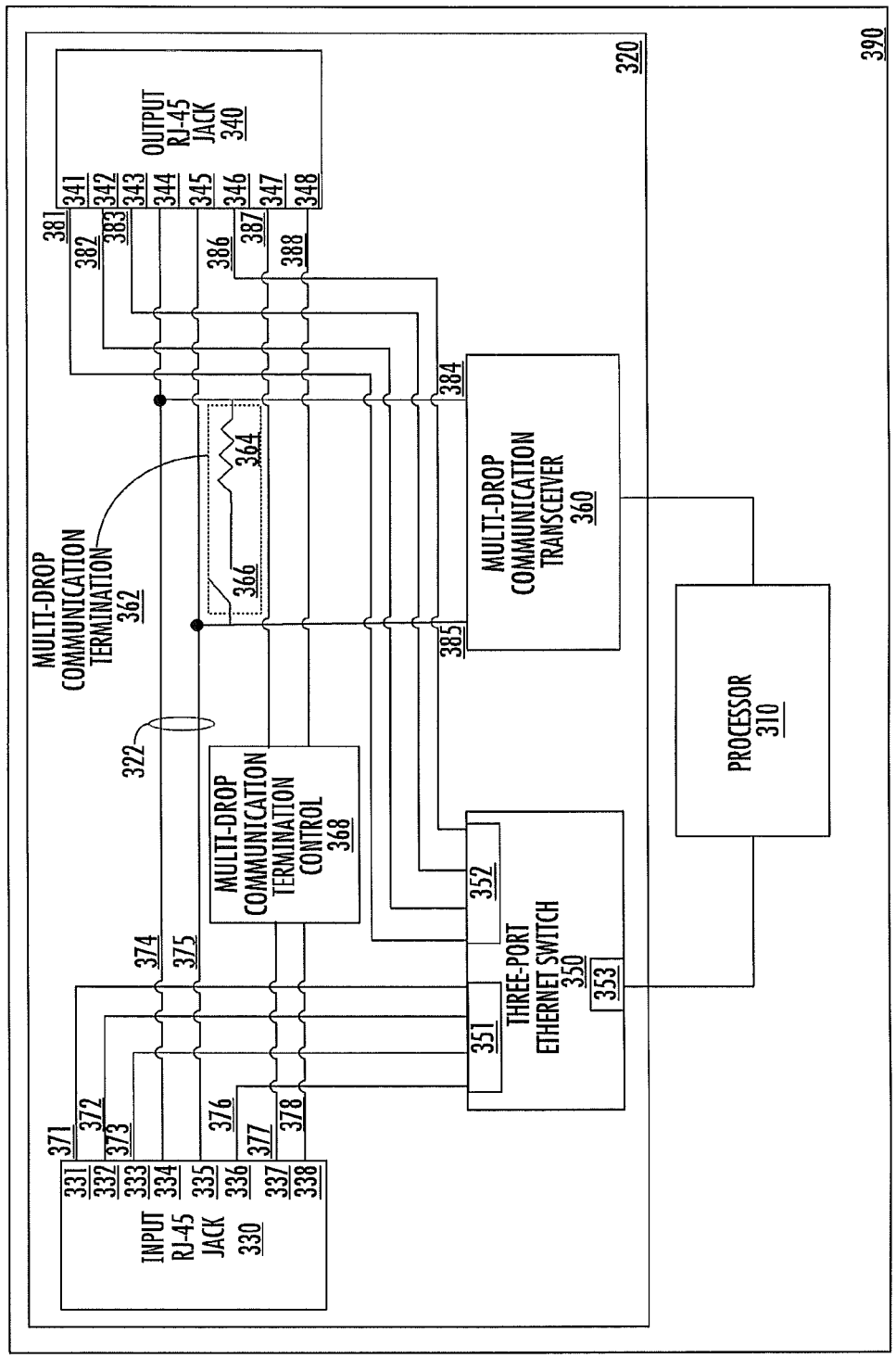
FIG. 5 is a block diagram of a controller according to further embodiments of the present invention that may be used in the local area network of FIG. 3.

FIG. 5 is a block diagram of a controller 300 according to further embodiments of the present invention. As shown in FIG. 5, the controller 300 includes a processor 310 and a communications interface 320. The processor 310 may comprise, for example, a microprocessor, an application specific integrated circuit (ASIC), a microcontroller or the like. The communications interface 320 includes an input connector 330, an output connector 340, a 3-port Ethernet switch 350, a multi-drop communication transceiver 360, a multi-drop communication termination 362, a multi-drop communication termination control circuit 368 and a printed circuit board 390.

The input connector 330 may comprise an RJ-45 jack that is mounted on the printed circuit board 390. The RJ-45 jack 330 includes a plurality of input contacts 331-338 which may comprise, for example cantilevered jackwire contacts that are formed of a resilient metal such as beryllium-copper or phosphor-bronze. The output connector 340 may likewise comprise an RJ-45 jack that is mounted on the printed circuit board 390. The RJ-45 jack 340 includes a plurality of output contacts 341-348 which may comprise, for example cantilevered jackwire contacts that are formed of a resilient metal such as beryllium-copper or phosphor-bronze.

It will be appreciated that while the connector ports 330 and 340 are referred to as an input connector port and an output connector port, the terms "input" and "output" are only used for ease of description to distinguish the two connector ports apart. As is made clear in the discussion above of the local area network 100 of FIG. 3, any of the controllers 110-1 through 110-8 can communicate with any of the other controllers and/or the system manager 130, and thus it is apparent that communications may flow in both directions through the daisy-chain configuration of controllers. Accordingly, it will be appreciated that communications signals may enter the controller 300 at the "output" connector port 340 and may exit the controller 300 at the "input" connector 330. The same is true with respect to the other embodiments of the present invention discussed herein.

As shown in FIG. 5, the three-port Ethernet switch 350 is interposed between the processor 310 and the input and output RJ-45 jacks 330, 340. In particular, a first set of conductive traces 371, 372, 373, 376 (which may be traces that extend on a single layer of printed circuit board 390 or can be a plurality of traces that are on multiple layers of the printed circuit board 390 that are electrically connected by metal-filled vias or by other layer transferring techniques known to those skilled in the art) are provided on the printed circuit board 390 that connect contacts 331, 332, 333 and 336 (i.e., pairs 2 and 3) of input connector port 330 to Ethernet switch 350. A second set of conductive traces 381, 382, 383, 386 are provided on the printed circuit board 390 that connect contacts 341, 342, 343 and 346 of output connector port 340 to Ethernet switch 350. The three-port Ethernet switch 350 includes three input/output ports 351-353. Port 351 is connected to conductive paths 371, 372, 373, 376, port 352 is connected to conductive paths 381, 382, 383, 386 and port 353 is connected to processor 310. The processor 310 may include an Ethernet Media Access Controller and a PHY chip, and may communicate through the port 353 via a media independent interface (not shown). The three-port Ethernet switch 350 may comprise, for example, a commercially available, printed circuit board mountable integrated circuit chip that receives Ethernet packets that arrive on any of the three ports 351-353 of the switch 350 and, based on the address information in those packets, routes the packets to the appropriate of the other ports 351-353 on the switch 350. An example of a suitable three-port Ethernet switch 350 is the KSZ8863 integrated circuit chip available from Micrel.

The Ethernet switch 350 may operate, for example, as follows. An Ethernet signal that is received, for example, on contacts 331 and 332 of input jack 330 (pair 2) is passed by the corresponding conductive traces 371, 372 to port 351 on Ethernet switch 350. The Ethernet switch 350 reads the header information on each received packet. If the header information indicates that the processor 310 is the intended recipient of the packet, then the Ethernet switch 350 passes the received packets to the processor 310. If not, the Ethernet switch 350 passes the packet through to port 352 where it is passed to the conductive traces 381, 382 that are connected to contacts 341 and 342 of output jack 340 so that the packet may be passed to the next controller in the local area network (see FIG. 3).

As is further shown in FIG. 5, contacts 334 and 335 of input jack 330 are connected by conductive traces 374, 375 on printed circuit board 390 to contacts 344 and 345, respectively, of output jack 340. Multi-drop communications that are input to controller 300 at contacts 334, 335 of input jack 300 are passed to output contacts 344, 345 of output jack 340 where they are passed to the next controller in the local area network (see FIG. 3). Additionally, a conductive trace 384 electrically connects conductive trace 374 to the multi-drop communication receiver 360, and a conductive trace 385 similarly electrically connects conductive trace 375 to the multi-drop communication receiver 360. These conductive traces 384, 385 pass multi-drop communication signals that are input to the controller 300 (either at input jack 330 or output jack 340) to the multi-drop communication receiver 360 which recovers the data in the signal and provides this data to the processor 310. The conductive paths 384, 385 are also used to pass multi-drop communication signals that are generated by the multi-drop communication transceiver 360 in response to the processor 310 to the conductive traces 374, 375 where they are passed to the local area network via contacts 334 and 335 of input jack 330 and contacts 344 and 345 of output jack 340.

As is also shown in FIG. 5, a multi-drop communication termination circuit 362 is provided that may be used to terminate the multi-drop communication transmission line 322 formed by conductive traces 374, 375. The termination circuit 362 may be designed to insert an impedance between the conductive traces 374 and 375 that matches the impedance of the multi-drop communication transmission line 322. In the illustrated embodiment, the termination circuit 362 comprises a 100 ohm resistor 364 and a switch 366 that are disposed in series between conductive trace 374 and conductive trace 375. If the controller 300 is at the end of a daisy-chained local area network such that no patch cord is connected into either the input jack 330 or the output jack 340, then the switch 366 may be closed so that the resistor 364 provides a matched termination to the multi-drop communication transmission line 322 that may reduce signal reflections and associated return losses.

The controller 300 further includes a termination control circuit 368. This termination control circuit 368 may be used to automatically terminate the transmission line 322 when no patch cord is received within either the input jack 330 or the output jack 340 by automatically closing the switch 366. The termination control circuit 368 may be connected to conductive traces 377, 378 that are electrically connected to contacts 337 and 338 of input jack 330 and to contacts 347 and 348 of output jack 340 via conductive paths 387, 388. The termination control circuit 368 may automatically sense whether or not contacts 337 and 338 of input jack 330 or contacts 347 and 348 of output jack 340 are open circuited and, if so, close the switch the 366. Operation of the termination control circuit 368 will be explained below with respect to the discussion of the circuit diagram of FIG. 6.

Embodiments of the present invention may take advantage of the fact that lower throughput Ethernet communications such as 10BASE-T and 100BASE-TX communications only use two of the four differential pairs (pairs 2 and 3) of conductors that are provided in Ethernet connectors and cables (one pair is used for transmission, the second pair for receiving), thus leaving two additional differential pairs unused. Pursuant to embodiments of the present invention, a differential multi-drop communication signal may be transmitted over one of these unused differential pairs (pair 1), thereby providing a back-up communications path in the event that the Ethernet communications path is lost due to a power outage, an equipment failure or the like. The second unused differential pair (pair 4) may be used to as a signal return path to ground for the multi-drop communication signals. The use of such a well-defined ground path facilitates providing error-free or low error communications over the multi-drop communications path.

In addition, according to some embodiments of the present invention, the second unused differential pair (pair 4) may also be used for purposes of termination control. In particular, in order to obtain good signal quality on the multi-drop communication transmission line 322, it is desirable to properly terminate both ends of the transmission line 322 to a matched impedance (which here would be the 100 ohm target impedance of a differential pair of an Ethernet patch cord). The termination control circuit 368 is provided to automatically sense whether or not the controller 300 is at the end of the daisy-chain in the local area network and, if so, to automatically terminate the multi-drop communication transmission line 322 to the matched termination 362 within the controller 300.

Figure 6:
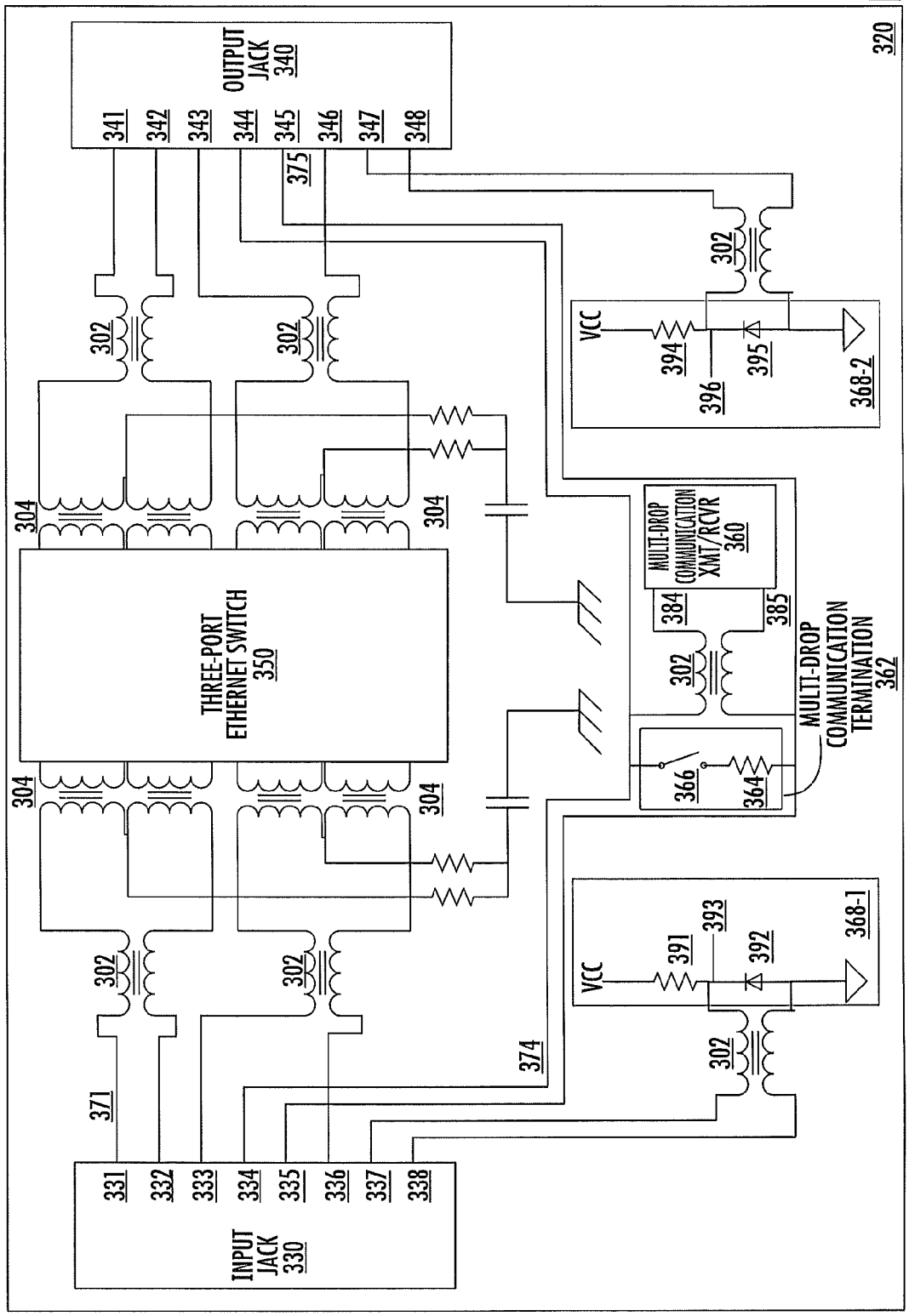
FIG. 6 is a circuit diagram of the controller of FIG. 5.

FIG. 6 is a circuit diagram of the controller 300 of FIG. 5 that provides additional details regarding one specific implementation of the communications interface 320 of the controller 300. As shown in FIG. 6, in addition to the elements of the communications interface 320 discussed above with respect to FIG. 5, the communications interface 320 may further include a plurality of common mode chokes 302 that reduce any common mode emissions that enter the controller 300 on contact pairs 331/332, 333/336 and/or 337/338 of input RJ-45 jack 330 and any common mode emissions that enter the controller 300 on contact pairs 341/342, 343/346 and/or 347/348 of output RJ-45 jack 340. The common mode chokes 302 likewise may reduce any common mode noise that may be emitted by the controller 300 onto the above-referenced contact pairs of the input and output RJ-45 jacks 330, 340. Ethernet magnetics 304 are also included which may provide galvanic isolation with respect to the three-port Ethernet switch 350.

The termination control circuit 368 is also depicted in FIG. 6. As shown in FIG. 6, the termination control circuit 368 includes a first circuit 368-1 that is connected to contacts 337 and 338 of input jack 330, and a second circuit 368-2 that is connected to contacts 347 and 348 of output jack 340. The termination control circuit 368-1 includes a resistor 391 and a diode 392 that are connected in series between a power supply voltage Vcc and a ground reference. The voltage of contact 337 passes through the common mode choke 302 and appears at terminal 393. The termination control circuit 368-2 includes a resistor 394 and a diode 395 that are connected in series between a power supply voltage Vcc and a ground reference. The voltage of contact 348 passes through the common mode choke 302 and appears at terminal 396. The termination control circuit 368 may be used to (1) carry a ground reference between adjacent controllers 300 in the LAN and (2) to automatically sense whether or not the input RJ-45 jack 330 and/or the output RJ-45 jack 340 are connected to another controller 300. If it is determined that at least one of the input RJ-45 jack 330 or the output RJ-45 jack 340 is not connected to another controller 300, then the termination control circuit 368 may generate one or more control signals that may be used to control the switch 366 in order to terminate the multi-drop communication transmission line to a matched termination using resistor 364.

The following discussion explains the operation of the termination control circuit 368 in greater detail. For purpose of this discussion, it is assumed that the input RJ-45 jack 330 of the controller 300 of FIG. 6 is connected to the output RJ-45 jack of a second controller 300-1, and that the output RJ-45 jack 340 of the controller 300 of FIG. 6 is connected to the input RJ-45 jack of a third controller 300-2 (neither controller 300-1 or 300-2 are illustrated in FIG. 6). The controllers 300-1 and 300-2 may be identical to the controller 300 illustrated in FIG. 6.

Referring again to FIG. 6, it can be seen that contact 338 on input RJ-45 jack 330 is connected to the ground reference provided in termination control circuit 368-1 via the common mode choke 302. Consequently, contact 338 will be set to a low level on the controller 300. The same will be true for the contacts 338 of controllers 300-1 and 300-2 since each of these controllers are identical to controller 300. Thus, when the output RJ-45 jack 340 of controller 300 is connected to controller 300-2, then the ground reference in termination control circuit 368-1 on controller 300-2 will be carried into controller 300 via contact 338 on controller 300-2 and the cabling connection between controllers 300 and 300-2, thereby pulling contact 348 on jack 340 on controller 300 to a low level. In this fashion, the ground reference from controller 300-2 may be provided to controller 300 (albeit the ground references may be offset by the voltage drop across the diode 395). Moreover, as is further shown in FIG. 6, contact 347 on output RJ-45 jack 340 of controller 300 is connected to the ground reference provided in termination control circuit 368-2 via the common mode choke 302. Thus, if controller 300-2 is connected to output jack 340 of controller 300, then both contacts 347 and 348 of controller 300 will be at a low level. In contrast, if controller 300-2 is not connected to controller 300, then contact 348 on controller 300 will not be pulled to a low level and instead will be held at a high level by the power supply voltage Vcc. Accordingly, the voltage levels of contact 348 may be used to sense whether or not controller 300-2 is connected to controller 300.

As noted above, contact 347 on output RJ-45 jack 340 is connected to the ground reference provided in termination control circuit 368-2 via the common mode choke 302. Consequently, contact 347 will be set to a low level on all three of the controllers 300, 300-1 and 300-2. Thus, when the input RJ-45 jack 330 of controller 300 is connected to controller 300-1, then the ground reference in termination control circuit 368-2 on controller 300-1 will be carried into controller 300 via contact 347 on controller 300-1 and the cabling connection between controllers 300-1 and 300, thereby pulling contact 337 on jack 330 of controller 300 to a low level. In this fashion, the ground reference from controller 300-1 may be provided to controller 300 (albeit the ground references may be offset by the voltage drop across the diode 392). Moreover, as is further shown in FIG. 6, contact 338 on input RJ-45 jack 330 of controller 300 is connected to the ground reference provided in termination control circuit 368-1 via the common mode choke 302. Thus, if controller 300-1 is connected to input jack 330 of controller 300, then both contacts 337 and 338 of controller 300 will be at a low level, and hence the voltage levels of contacts 337 and 338 may be used to sense whether or not controller 300-1 is connected to controller 300. In some embodiments, a simple logic circuit may be provided that controls the switch 366 in response to the voltages that are present on some or all of contacts 337, 338, 347 and 348 so that the switch 366 is closed if any of those four voltages are, for example, at a high level.

Thus, as shown above, the termination control circuit 368 may be used to both carry a ground reference between adjacent controllers 300 in the LAN and to automatically sense whether or not the controller 300 is in the middle or the end of the daisy-chain and, if at the end, to automatically terminate the multi-drop communication transmission line to a matched termination.

Figure 7:
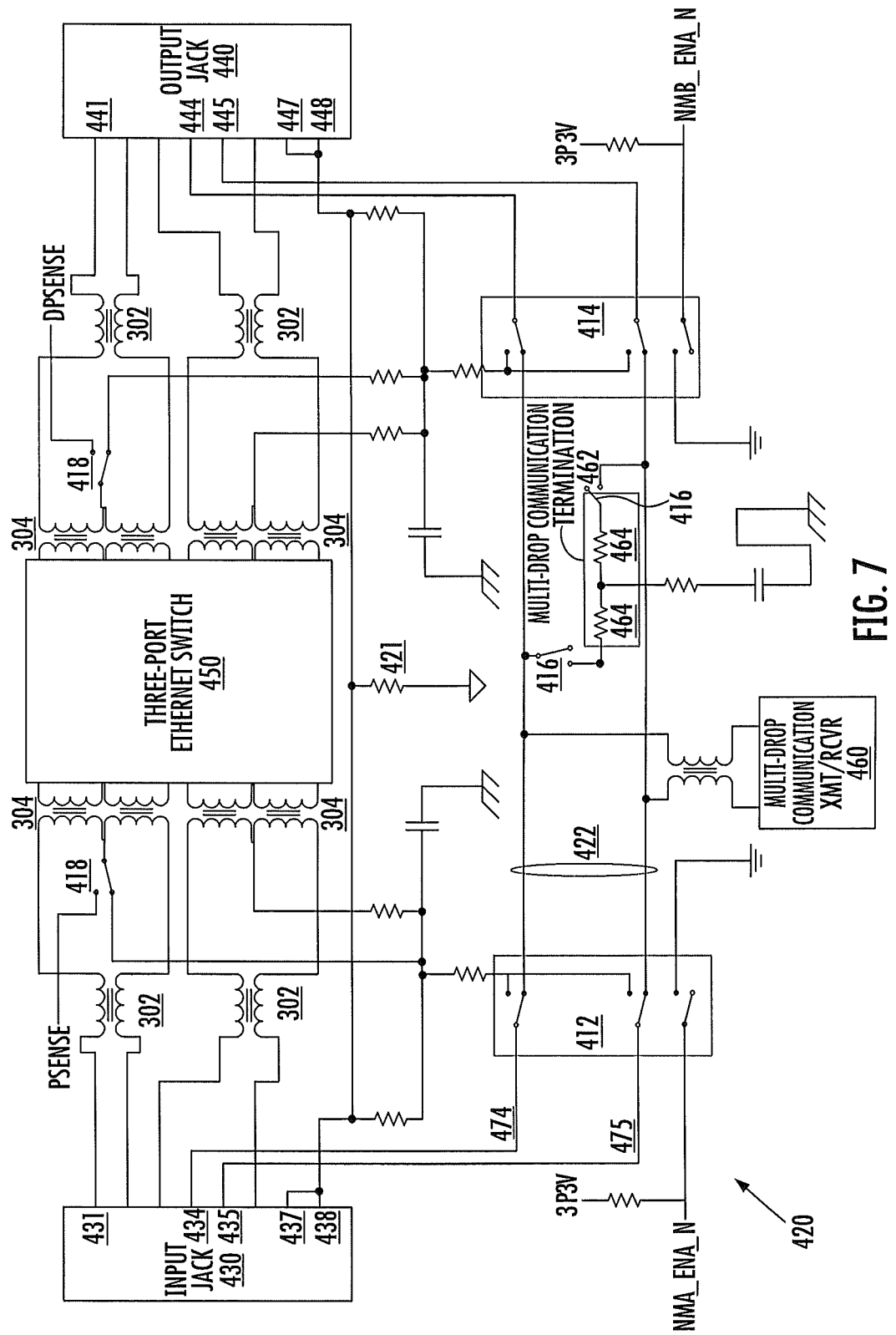
FIG. 7 is a circuit diagram of a controller according to further embodiments of the present invention.

A plurality of the controllers 300 of FIGS. 5 and 6 may be used to implement the local area network 100 of FIG. 3. However, as shown in FIG. 3, in some embodiments it may be desirable to have the network manager controller 110-1 of FIG. 3 interface with a system manager 130 on the customer's local area network 132 via a standard 10BASE-T or 100BASE-TX Ethernet connection 134. The input and output jacks 330, 340 of the controller 300 of FIGS. 5 and 6 may not be suitable for use on such a standard 10BASE-T or 100BASE-TX Ethernet connection 134, as in a standard 10BASE-T or 100BASE-TX connection, the contacts of pair 1 (contacts 4 and 5) are shorted together and tied to ground. As such, the controller 300 of FIGS. 5 and 6 may include an additional RJ-45 jack (not shown in FIGS. 5 and 6) that may be used to support a standard 10BASE-T or 100BASE-TX Ethernet connection to such a system manager 130. Pursuant to further embodiments of the present invention, controllers are provided that may support such a standard 10BASE-T or 100BASE-TX Ethernet connection through the same input and/or output jacks that are used to carry bother Ethernet and multi-drop communications, thereby eliminating any need for an additional Ethernet jack for connecting to the customer local area network 132. FIG. 7 is a circuit diagram of a communications interface 420 according to further embodiments of the present invention that can support a standard 10BASE-T or 100BASE-TX Ethernet connection to, for example, a system manager 130 through either the input jack or the output jack thereof.

As shown in FIG. 7, the communications interface 420 includes an input RJ-45 jack 430, an output RJ-45 jack 440, a 3-port Ethernet switch 450, a multi-drop communication transceiver 460, and a multi-drop communication termination 462. The input RJ-45 jack 430, the output RJ-45 jack 440, the 3-port Ethernet switch 450 and the multi-drop communication transceiver 460 may be identical to the corresponding components 330, 340, 350 and 360 in the communications interface 320 of FIGS. 5-6, and hence further description of these elements will be omitted.

The communications interface 420 differs from the communications interface 320 in that the communications interface 420 includes a first set of three manual switches 412 that are used to configure the input RJ-45 jack 430 into one of either a standard Ethernet configuration or an Ethernet/multi-drop configuration, and a second set of three manual switches 414 that are used to configure the output RJ-45 jack 440 into one of either a standard Ethernet configuration or an Ethernet/multi-drop configuration. Herein, the term "Ethernet/multi-drop configuration" refers to a configuration where the jack is configured to support Ethernet communications over two of its differential pairs and multi-drop communications over a third of its differential pairs. In FIG. 7, the first set of switches 412 are shown set in a position that configures the input RJ-45 jack 430 to operate in an Ethernet/multi-drop configuration, and the second set of switches 414 is likewise set in a position that configures the output RJ-45 jack 440 to operate in an Ethernet/multi-drop configuration. In such a configuration, the jacks 430, 440 can transmit and receive either Ethernet or multi-drop communications in the manner described above for communications interface 320. If each switch in the first set of switches 412 is flipped from the position illustrated in FIG. 7 to its alternative position, then contacts 434 and 435 of jack 430 are disconnected from the multi-drop communication transmission line and are instead tied together and connected to ground (as would be the case with a standard 10BASE-T or 100BASE-TX Ethernet connection). In this configuration, the input RJ-45 jack 430 is appropriately configured to connect to a standard 10BASE-T or 100BASE-TX Ethernet connection. Likewise, if each switch in the second set of switches 414 is flipped from the position illustrated in FIG. 7, then contacts 444 and 445 of jack 440 are disconnected from the multi-drop communication transmission line and are instead tied together and connected to ground. In this configuration, the output RJ-45 jack 440 is similarly configured to connect to a standard 10BASE-T or 100BASE-TX Ethernet connection. Thus, with the communications connection interface 420 of FIG. 7, a network administrator may manually set the switches in the sets of switches 412 and 414 to a desired position to configure the input and output jacks 430 and 440 to be in a standard Ethernet connection (e.g., as would be the case for the input jack of network manager 110-1 of FIG. 3) or to be in an Ethernet/multi-drop configuration (e.g., as would be the case for the input and output jacks on controllers 110-2 through 110-8 of FIG. 3).

The communications interface 420 of FIG. 7 also includes a third set of switches 416 that may be used to connect a pair of termination resistors 464 in between conductive paths 474 and 475 (i.e., the conductive paths that form the multi-drop communication transmission line 422) in order to terminate the multi-drop communication transmission line 422 when the communications interface 420 is set up to operate in its Ethernet/multi-drop configuration and input jack 430 and/or output jack 440 are not connected to an adjacent controller. The termination resistors 464 together operate like resistor 364 of communications interface 320, and hence further description thereof will be omitted. In the circuit of FIG. 7, switch 416 may be automatically controlled based upon the position of the sets of switches 412 and 414 as indicated by the signals NMA_ENA_N and NMB_ENA_N. These two signals are high when their respective sets of switches 412 and 414 are set to the Ethernet/multi-drop configuration depicted in FIG. 7, and are low otherwise. If either set of switches 412 or 414 is not set to the Ethernet/multi-drop configuration as shown in FIG. 7, then the controller will be at the end of the multi-drop communications transmission line, and switch 416 may be automatically set to the closed position to properly terminate said multi-drop communications transmission line.

The communications interface 420 of FIG. 7 also differs from the communications interface 320 of FIGS. 5 and 6 in that the communications interface 420 does hot include the termination control circuits 368-1 and 368-2 that are included in the communications interface 320. Instead, in the communications interface 420, contacts 437 and 438 of jack 430 are tied together and connected to ground through a 100 ohm resistor 421, and contacts 447 and 448 of jack 440 are likewise tied together and connected to ground through the 100 ohm resistor 421. The simpler termination control circuit that is provided in communications interface 420 may be used since the multi-drop communication transmission line 422 may be automatically terminated based upon the positions of the sets of switches 412 and 416, and hence automatic sensing as to whether or not adjacent controllers are connected to the input and output jacks 430 and 440 may be omitted.

Finally, the communications interface 420 of FIG. 7 further differs from the communications interface 320 of FIGS. 5 and 6 in that the communications interface 420 includes a fourth set of switches 418 that may be set to allow the controller that includes communications interface 420 to communicate with legacy controllers that only included a multi-drop communication transmission line on pair 1 of its input and output RJ-45 jacks. The signals PSENSE and DPSENSE may be used to allow the controllers in a daisy-chain configuration to automatically determine their respective positions in the daisy-chain. PSENSE is the input, and DPSENSE is the output. When connected in the daisy-chain, the DPSENSE output of one controller is connected to the PSENSE input of the next controller in the chain.

Figure 8:
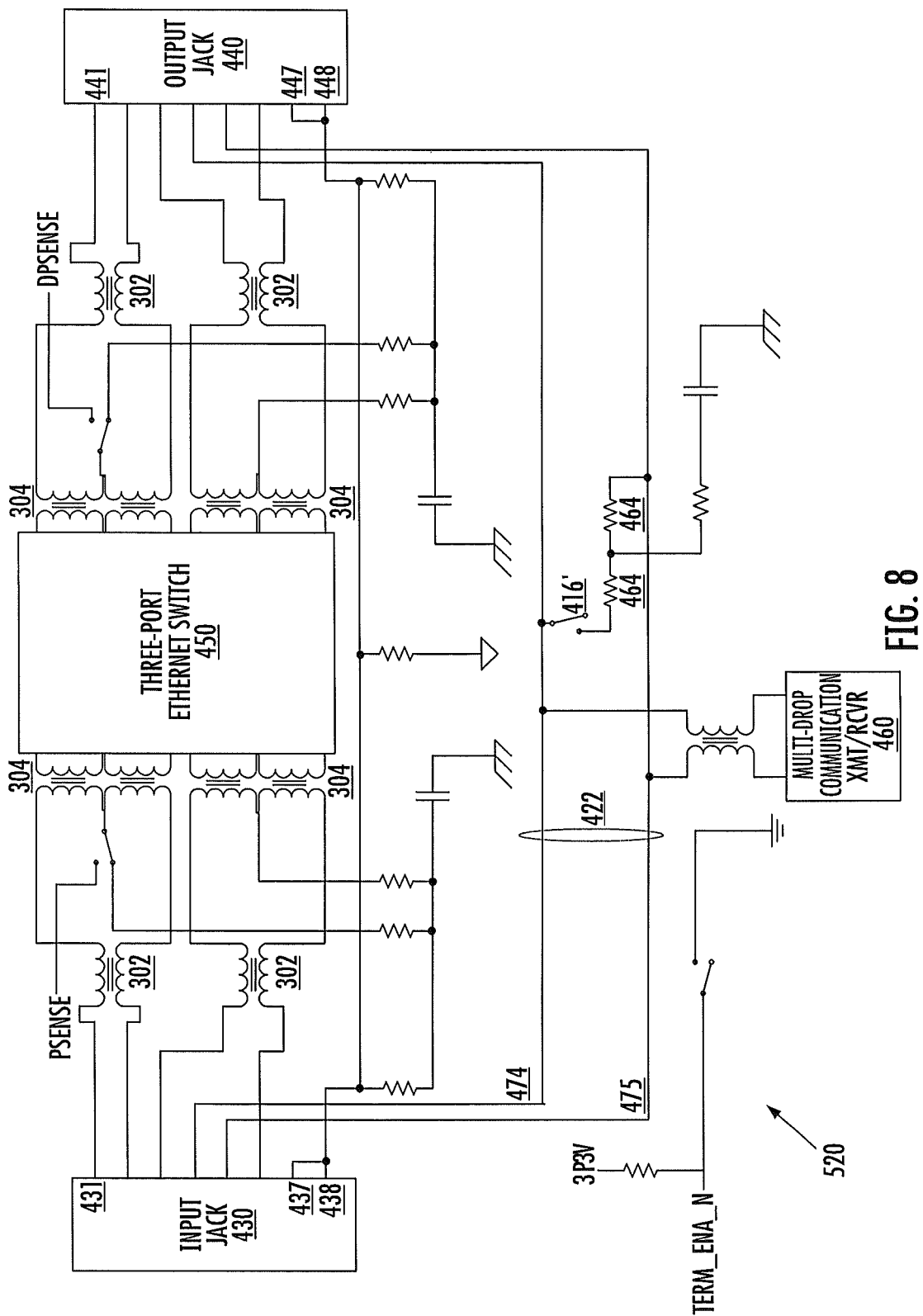
FIG. 8 is a circuit diagram of a controller according to still further embodiments of the present invention.

FIG. 8 is a circuit diagram of a communications interface 520 according to further embodiments of the present invention. The communications interface 520 is similar to the communications interface 420 of FIG. 7, except that the communications interface 520 is not configured to also support standard 10BASE-T and/or 100BASE-TX Ethernet communications (i.e., for connecting to a customer local area network).

As shown in FIG. 8, the communications interface 520 is almost identical to the interface 420, except that the switches in the first set of switches 412 that connected to contacts 434 and 435 of jack 430 are omitted, as are the switches in the second set of switches 414 that connected to contacts 444 and 445 of jack 440. These switches are not necessary in the interface 520 as the interface 520 is not designed to connect to a standard Ethernet interface in an external network. The switch 416' provided in communications interface may be set by a network administrator to place resistors 464 in series between conductive paths 474 and 475 in order to terminate the transmission line 422 to a matched termination when one of jacks 430 or 440 are not connected to an adjacent controller.

Figure 9:
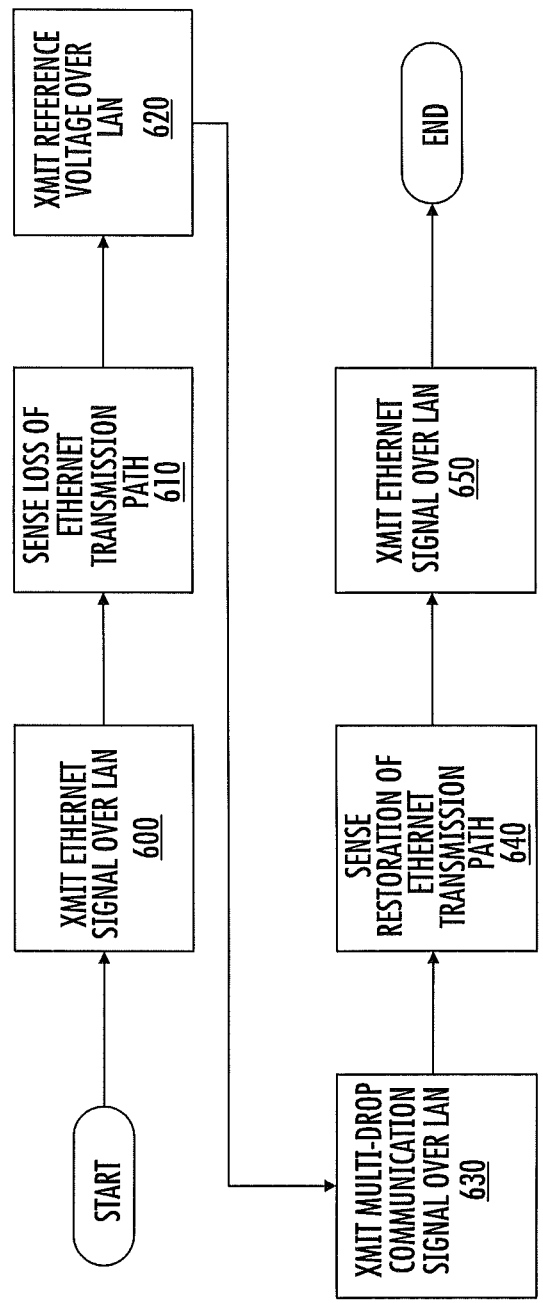
FIG. 9 is a flow chart diagram illustrating the operation of a local area network according to certain embodiments of the present invention.

Pursuant to further embodiments of the present invention, methods of operating a local area network that includes local area controllers according to embodiments of the present invention are provided. FIG. 9 is a flow chart that illustrates one such exemplary method. The method of FIG. 9 may be performed, for example, on a local area network that includes at least three controllers that are connected in a daisy-chain fashion with a first Ethernet cable connecting the first controller to the second controller and a second Ethernet cable connecting the second controller to the third controller.

As shown in FIG. 9, operations may begin with the transmission of an Ethernet signal such as, for example, an Ethernet control signal from the first controller to the second controller over the first Ethernet cable (block 600). Thereafter, the local area network (or a component thereof) may sense that an Ethernet transmission path between the first controller and the third controller has been lost (block 610). In some embodiments, the loss of the Ethernet transmission path may be detected by the link status bit in the Ethernet switch. A reference voltage that is used for the multi-drop communications may be transmitted from the first controller to the third controller over a reference voltage transmission path (block 620). In some embodiments, this reference voltage transmission path may comprise at least one conductor of a fourth pair of twisted conductors of the first Ethernet cable and at least one conductor of a fourth pair of twisted conductors of the second Ethernet cable. After the loss of the Ethernet transmission path has been detected and the reference voltage is transmitted, a signal may be transmitted from the first controller to the third controller over a multi-drop communication transmission path that extends through the first and second Ethernet cables (block 630). In some embodiments, the first Ethernet transmission path may comprise a first pair of twisted conductors of the first Ethernet cable and a first pair of twisted conductors of the second Ethernet cable, and the multi-drop communication transmission path may comprise a second pair of twisted conductors of the first Ethernet cable and a second pair of twisted conductors of the second Ethernet cable.

As is further shown in FIG. 9, the Ethernet transmission path may ultimately be restored, and the subsequent availability of the Ethernet transmission path may then be detected (block 640). In some embodiments, the detection of the re-availability of the Ethernet transmission path may be performed manually (e.g., input by a network administrator), while in other embodiments the re-availability of the Ethernet transmission path may be automatically detected. In response to detecting the re-availability of the Ethernet transmission path, a signal may be transmitted from the first controller to the third controller over the Ethernet transmission path (block 650).

It will be appreciated that many modifications may be made to the above-described embodiments without departing from the scope of the present invention. By way of example, in certain of the embodiments discussed above a logic circuit may be provided as part of the termination control circuit that generates one or more control signals that are used to set the switch in the multi-drop communication termination. It will be appreciated, however, that in other embodiments the switch may be controlled in other ways such as, for example, by control signals that are generated by firmware.

The present invention has been described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed above can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Herein, the term "Ethernet cable" refers to a cable that includes at least four twisted differential pairs of insulated conductors that are suitable for use as a transmission medium for computer communications.

Certain embodiments of the present invention have been described above with reference to flowchart illustrations. It will be understood that some blocks of the flowchart illustrations may be combined or split into multiple blocks, and that the blocks in the flow chart diagrams need not necessarily be performed in the order illustrated in the flow charts. It will also be understood that each block of the flowchart illustrations, and combinations of blocks in the flowchart illustrations, can be implemented by computer program instructions. These computer program instructions may be provided to a processor to produce a machine, such that the instructions, which execute via the processor of the computer or other programmable data processing apparatus, implement the functions/acts specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart block or blocks.

In the drawings and specification, there have been disclosed typical embodiments of the invention and, although That which is claimed is:

1. A communications interface, comprising:
a connector port that includes housing that defines a plug aperture and at least first through eighth contacts that extend into the plug aperture;
an Ethernet interface;
a multi-drop communication interface;
first through fourth conductive paths that electrically connect the respective first through fourth contacts to the Ethernet interface; and
fifth and sixth conductive paths that electrically connect the respective fifth and sixth contacts to the multi-drop communication interface.

2. The communications interface of claim 1, further comprising a multi-drop communication termination that is electrically connected between the fifth and sixth conductive paths.

3. The communications interface of claim 2, further comprising:
a multi-drop communication termination control circuit; and
seventh and eighth conductive paths that electrically connect the respective seventh and eighth contacts to the multi-drop communication termination control circuit.

4. The communications interface of claim 3, wherein the multi-drop communication termination comprises a switch and a resistor that are disposed in series between the fifth and sixth conductive paths, and wherein the multi-drop communication termination comprises a switched termination that selectively terminates a multi-drop communication transmission line that includes the fifth and sixth conductive paths.

5. The communications interface of claim 4, wherein the multi-drop communication termination control circuit comprises a logic circuit that is configured to automatically sense if the multi-drop communication interface is electrically connected to a downstream device via a second communications connector.

6. The communications interface of claim 5, wherein the multi-drop communication termination control circuit is configured to close the switch in response to determining that the multi-drop communication interface is not electrically connected to the downstream device via the second communications connector or to open the switch in response to determining that the multi-drop communication interface is electrically connected to the downstream device via the second communications connector.

7. The communications interface of claim 1, wherein the communications connector comprises an RJ-45 jack, and wherein the first through eighth contacts comprise spring jackwire contacts.

8. The communications interface of claim 7, wherein the Ethernet interface comprises an Ethernet switch that includes at least three input/output ports.

9. The communications interface of claim 8, wherein the first through fourth conductive paths are electrically connected to respective first through fourth contacts of a second RJ-45 jack via the Ethernet switch.

10. The communications interface of claim 8, wherein the fifth and sixth conductive paths are electrically connected to respective fifth and sixth contacts of the second RJ-45 jack, and wherein the multi-drop communication interface is connected to the fifth and sixth conductive paths via respective first and second tap lines.

11. The communications interface of claim 10, wherein the multi-drop communication interface comprises an RS-485 transceiver.

12. The communications interface of claim 1 integrated into a controller, wherein the connector port comprises an input RJ-45 connector port of the controller, the controller further including:
a processor; and
an output RJ-45 connector port that includes first through eighth contacts;
wherein a seventh conductive path connects the fifth contact of the input RJ-45 connector port to the fifth contact of the output RJ-45 connector port,
wherein an eighth conductive path connects the sixth contact of the input RJ-45 connector port to the sixth contact of the output RJ-45 connector port,
wherein the processor is electrically connected to the first through fourth contacts of the input RJ-45 connector port and the first through fourth contacts of the output RJ-45 connector port via the Ethernet interface, and
wherein the processor is electrically connected to the fifth and sixth contacts of the input RJ-45 connector port and to the fifth and sixth contacts of the output RJ-45 connector port via the multi-drop communication interface.

13. A local area network that includes the controller of claim 12, which comprises a first controller, in combination with a second controller according to claim 12 and a third controller according to claim 12, the local area network further including:
a first Ethernet cable that connects the input RJ-45 connector port on the first controller to the output RJ-45 connector port on the second controller; and
a second Ethernet cable that connects the input RJ-45 connector port on the second controller to the output RJ-45 connector port on the third controller.

14. The local area network of claim 13, wherein each of the first through third controllers further comprises a switch-activated matched termination that terminates a transmission line that includes the first conductive path and the second conductive path to a matched termination.

15. The local area network of claim 14, wherein each of the first through third controllers further includes a multi-drop communication termination control circuit that controls a switch of the switch-activated matched termination.

16. The local area network of claim 15, wherein the switch-activated matched termination on each of the first through third controllers comprises a resistor that is disposed in series with the switch.

17. The local area network of claim 13, wherein the Ethernet interface of each controller comprises an Ethernet switch, and wherein the multi-drop communication interface of each controller comprises a RS-485 transceiver.

18. The communications interface of claim 1 integrated into a controller, wherein the connector port comprises an input RJ-45 connector port of the controller, the controller further including:
an output RJ-45 connector port that includes first through eighth contacts, wherein the fifth contact of the output RJ-45 connector port is electrically connected to the fifth contact of the input RJ-45 connector port and the sixth contact of the output RJ-45 connector port is electrically connected to the sixth contact of the input RJ-45 connector port; and
a processor that is selectively electrically connected to the first through fourth contacts of the input RJ-45 connector and to the first through fourth contacts of the output RJ-45 connector, the processor further being electrically connected to the fifth and sixth contacts of the input RJ-45 connector port and to the fifth and sixth contacts of the output RJ-45 connector port via the multi-drop communication transceiver.

19. The controller of claim 18, further comprising an Ethernet switch that is configured to selectively route a differential signal that is received on the first and second contacts of the input RJ-45 connector port to one of the first and second contacts of the output RJ-45 connector port or to the processor, and which is further configured to selectively route a differential signal that is received on the third and fourth contacts of the output RJ-45 connector port to one of the third and fourth contacts of the input RJ-45 connector port or to the processor.

20. The controller of claim 18, further comprising a termination circuit that is configured to insert a resistance in series between the fifth contact of the input RJ-45 connector port and the sixth contact of the input RJ-45 connector port in response to a termination control signal.

* * * * *